United States Patent [19]

Miller et al.

[11] Patent Number: 4,815,057
[45] Date of Patent: Mar. 21, 1989

[54] MULTIPLE-PLAYER DISC-CHANGER APPARATUS

[75] Inventors: Kenneth C. Miller, Mountain View; Laszlo Sipos; Paul L. Sipos, both of Saratoga, all of Calif.

[73] Assignee: Kubik Enterprises, Inc., Saratoga, Calif.

[21] Appl. No.: 200,706

[22] Filed: May 31, 1988

Related U.S. Application Data

[63] Continuation-in-part of Ser. No. 866,779, May 23, 1986, Pat. No. 4,750,160.

[51] Int. Cl.⁴ .............................................. G11B 17/24
[52] U.S. Cl. ...................................... 369/37; 369/198
[58] Field of Search ...................... 369/36, 37, 38, 39, 369/198, 197, 265

[56] References Cited

U.S. PATENT DOCUMENTS

| | | | |
|---|---|---|---|
| 3,008,721 | 11/1961 | Corbett, Jr. et al. | 274/10 |
| 3,658,347 | 4/1972 | Cheeseboro | 274/9 B |
| 4,344,162 | 8/1982 | Foufounis . | |
| 4,527,262 | 7/1985 | Manto | 369/39 |
| 4,567,584 | 1/1986 | Kawakami | 369/36 |
| 4,608,679 | 8/1986 | Rudy et al. | 369/39 |
| 4,750,160 | 6/1988 | Miller et al. | 369/37 |
| 4,754,445 | 6/1988 | Young et al. | 369/37 |

FOREIGN PATENT DOCUMENTS 235334  5/1960  Australia .............................. 369/37

OTHER PUBLICATIONS

Sales brochure, Nicco, date unknown.
Sales brochure, Pioneer, date unknown.
Technical Data Sheet, Denon/Nippon Columbia Co., Ltd., date unknown.
Sales brochure, Seeburg, date unknown.
Sales brochure, Technics, date unknown.

*Primary Examiner*—Stevan L. Stephan
*Attorney, Agent, or Firm*—Limbach, Limbach & Sutton

[57] ABSTRACT

An automatic disc changer apparatus operable for selecting and loading any one of a plurality of data discs onto multiple disc players or other data input/output device is disclosed. The disc changer apparatus includes a disc storage rack that stores the discs in a toroidal arrangement, a disc selecting mechanism for selecting a disc for loading onto the data input/output device, a plurality of disc players, and a plurality of disc handling mechanisms, each associated with a disc player, for transferring a selected disc from the disc storage rack to the disc player.

12 Claims, 8 Drawing Sheets

MULTIPLE-PLAYER DISC-CHANGER APPARATUS

This application is a continuation-in-part of application Ser. No. 06/866,779, filed May 23, 1986, now U.S. Pat. No. 4,750,160.

BACKGROUND OF THE INVENTION

1. Field of the Invention

This invention relates generally to digital data storage apparatus, and relates more particularly to an automatic disc changer apparatus for selecting and loading any one of a plurality of digital data discs onto multiple data input/output devices.

2. Description of the Relevant Art

One relatively new form of storing digital data is optically based, in which digital data is stored on and retrieved from a data disc in an optically discernible form using a laser read/write head. In common use today are audio compact discs and players that recreate audio sounds based upon digitized audio information stored on the audio compact discs. The audio compact disc is a rigid plastic disc of about 4.7 inches in diameter with a concentric 0.6 inch diameter center hole. Also in use today are optically based disc systems for use as digital storage devices for computers, known as CD ROM devices, where CD ROM stands for compact disc read-only memory. Other storage devices have means for both storing data onto and retrieving data from the data discs.

Most currently available optical data systems are capable of accessing only a single data disc at a time, which must be loaded by hand. In some compact disc players, a drawer extends outward to accept an audio compact disc to be played, then the drawer retracts into the body of the compact disc player to load the compact disc onto a spindle of the player. In other compact disc players, a lid or cover is lifted, the audio compact disc is inserted into the compact disc player, and the lid or cover is then closed to bring the compact disc into engagement with the spindle. In operation, the spindle engages the center hole and rotates the disc, while the laser head tracks radially to read the digitally stored data in a spiral pattern.

Some compact disc players are available that can access multiple compact discs. Up to a dozen or so compact discs are loaded into a magazine, which is then inserted into the compact disc player. When a compact disc is selected for play, a loading mechanism loads the disc onto the play mechanism of the disc player. When another compact disc is selected, one disc must be unloaded from the disc player and reinserted into the magazine before the next disc can be loaded onto the disc player.

SUMMARY OF THE INVENTION

The present invention provides an automatic disc changer apparatus that is operable for selecting and loading any one of a plurality of data discs onto multiple disc players or other data input/output devices. The disc changer apparatus includes a disc storage rack, a plurality of data input/output devices located around the periphery of the disc storage rack, disc selecting means for rotating the disc storage means to position a selected data disc adjacent to a selected data input/output device, a plurality of disc staging mechanisms for rolling a selected data disc along a horizontal ramp between the storage rack and a staged position adjacent to the data input/output device, and a plurality of spindle loading mechanisms for transferring the selected data disc between the staged position and a spindle of the data input/output device. Each disc staging mechanism and spindle loading mechanism is associated with one data input/output device.

The preferred embodiment of the disc changer apparatus loads digital compact discs onto multiple compact disc players. The disc storage rack rotates about a vertical axis and retains the digital compact discs in radially disposed storage slots. The disc selecting means includes a drive motor and a position feedback sensor that rotate the disc storage rack to position a selected disc at the load position adjacent to a selected disc staging mechanism. The disc staging and spindle loading mechanisms transfer the selected disc from the disc storage rack to the spindle of the selected compact disc player. The disc staging mechanism rolls the selected disc radially outward from the disc storage rack to the staged position immediately adjacent to the compact disc player, then the spindle loading mechanism clamps the selected disc onto the spindle of the compact disc player. Preferably, both the disc staging and spindle loading mechanisms are driven by a single electric motor and gear drive.

The features of the automatic disc changer apparatus of the present invention provide many advantages over conventional disc players. One significant advantage is that, due to the packaging efficiency of the disc storage rack, hundreds of data discs can be accessed without manually selecting and loading each data disc into the disc player. A further advantage is that the multiple disc players allow staging of discs so that transitions from accessing one to accessing another can be accomplished without a pause for unloading one disc and loading another. Still another advantage is that each disc player can access a disc independently, so that several discs can be accessed simultaneously. A still further advantage is that either side of a double-sided disc can be accessed, even if each player can access only one side of the disc.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 5a is a section taken along section line 5a—5a of FIG. 3c, and FIG. 5b is a section taken along section line 5b—5b of FIG. 3d.

FIG. 6a is a section taken along section line 6a—6a of FIG. 5a, and FIG. 6b is a section taken along section line 6b—6b of FIG. 5b.

DETAILED DESCRIPTION OF THE PREFERRED EMBODIMENT

FIGS. 1 through 9 of the drawings depict various embodiments of the present invention for purposes of illustration only. One skilled in the art will readily recognize from the following discussion that alternative embodiments of the structures and methods illustrated herein may be employed without departing from the principles of the invention described herein. The disclosure contained in my copending patent application Ser. No. 06/866,779, filed May 23, 1986, now U.S. Pat. No. 4,750,160, is hereby incorporated by reference.

Figure 1:
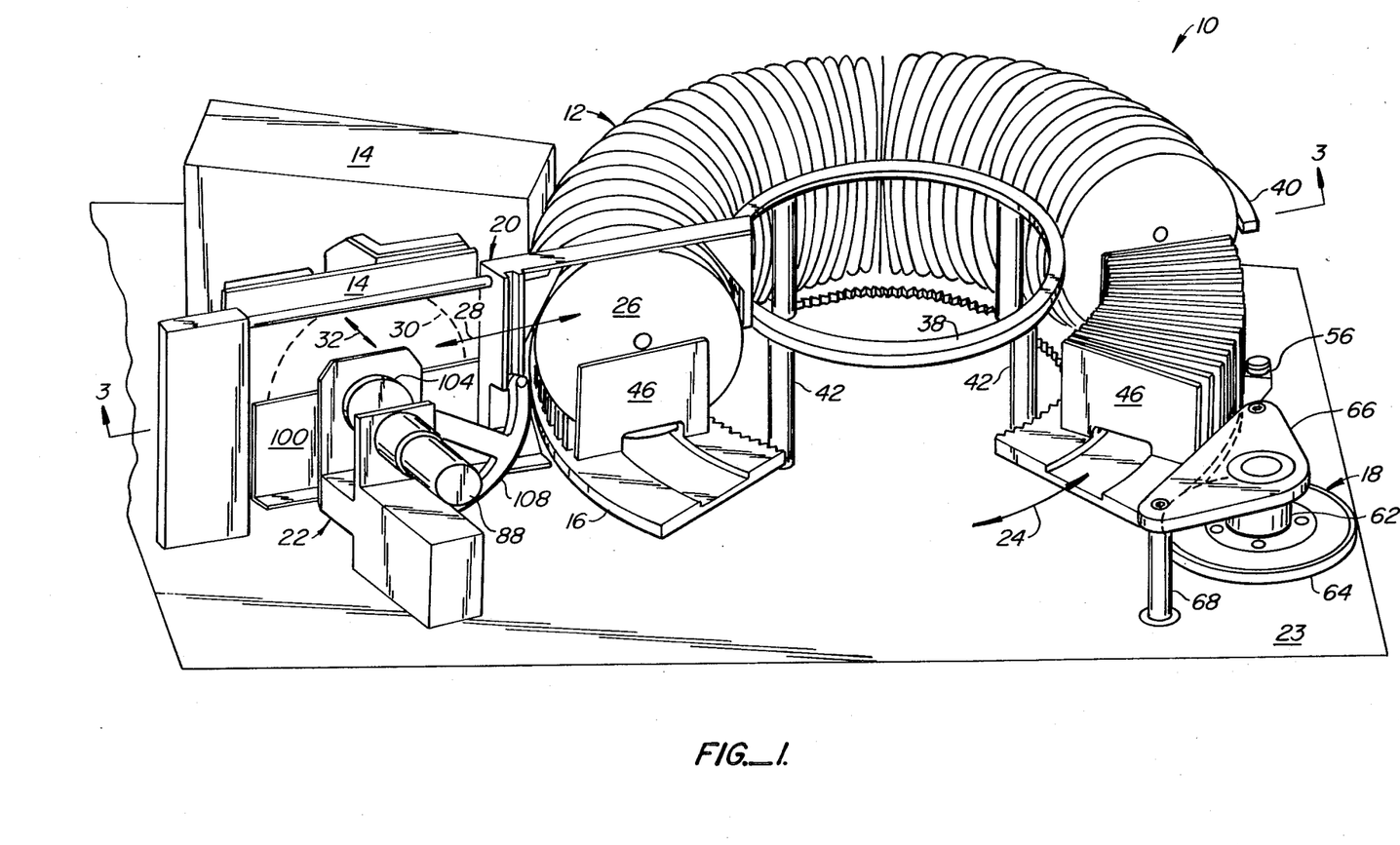
FIG. 1 is an overall perspective view, partially cut away, of an automatic disc changer apparatus according to the present invention.

The preferred embodiment of the present invention is an automatic disc changer apparatus 10 that is capable of selecting and loading any one of a plurality of audio compact discs 12 onto the spindle of a plurality of compact disc players 14, as shown in FIG. 1. However, more generally stated, the automatic disc changer apparatus is capable of selecting and loading any one of a plurality of data discs onto the spindle of any one of a plurality of data input/output devices. The automatic disc changer apparatus is also capable of unloading the data disc from the spindle of the data input/output device and returning the disc to a storage rack, which contains the other data discs.

The disc changer apparatus 10 includes the following subsystems: a disc storage rack 16, a storage rack positioning mechanism 18, a plurality of disc players 14, a plurality of disc staging mechanisms 20 and spindle loading mechanisms 22, each associated with one disc player. All of the above subsystems are mounted on or coupled to a base plate 23. These subsystems will be described briefly in reference to FIG. 1, and will be described in greater detail below. The disc storage rack 16 holds several discs 12 in a toroidal arrangement. The storage rack positioner 18 rotates the disc storage rack 16 about a vertical axis in either direction 24 upon command to position a selected disc at a load position 26 ready for loading onto the adjacent disc player 14. The disc staging mechanism 20 rolls the selected disc radially outward along direction 28 from the load position 26 to a staged position 30 adjacent to the disc player 14. The spindle loading mechanism 22 moves the selected disc from the staged position 30 toward the disc player 14 along direction 32 to load the selected disc onto the spindle of the disc player. To unload the disc from the disc player 14 and replace it back on the disc storage rack 16, the motions of the spindle loading mechanism 22 and the disc staging mechanism 20 are reversed.

Also shown in FIG. 1 is an inner ring 38 and an outer ring 40, both positioned concentric to the toroid formed by the discs 12 carried in the storage rack 16. The inner and outer rings 38 and 40 are positioned near a horizontal plane through the centers of the discs 12, and are mounted to the base plate 23 with standoffs 42.

Figure 2:
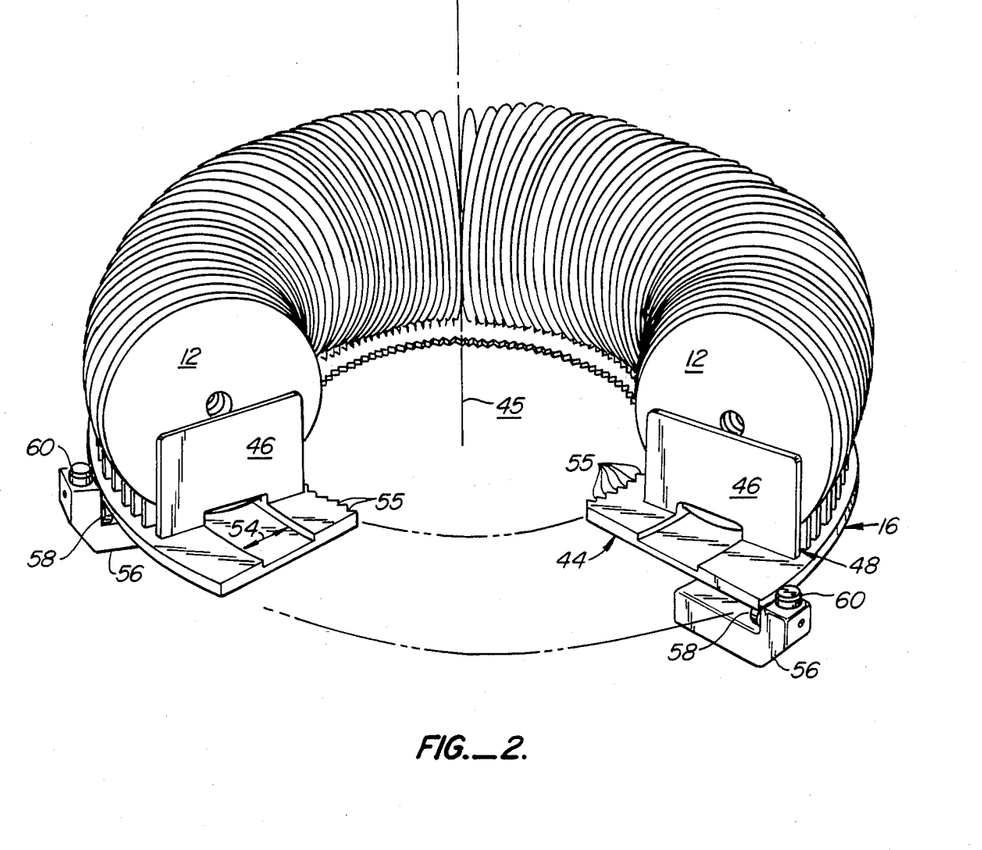
FIG. 2 is a perspective view, partially cut away, of a disc storage rack of the disc changer apparatus of FIG. 1.

The disc storage rack 16, as shown partially cut away in both FIGS. 1 and 2, provides means for storing the data discs in a toroidal arrangement. The disc storage rack 16 has a horizontally disposed base member 44 that is concentric to the vertical axis 45 of the storage rack, and has a plurality of spacer members 46 that extend from the top side of the base member. Between each two spacer members 46 is a radially extending storage slot 48 into which a disc 12 can be placed. The base member 44 is a ring that has a concentric slot or groove 54 in its upper surface. The lower periphery of a disc 12 stored in a storage slot 48 rests in the slot 54. When the disc storage rack 16 is rotated, the slot 54 provides radial support for the discs 12, while the spacer member 46 provide tangential support for the discs. The inner edge of the inner ring 50 is serrated to form a series of detents or notches 55, preferably one for each storage slot 48. A sensor, not shown, senses the passage of the detents 55 to enable the rotational position of the disc storage rack 16 to be determined. In the preferred embodiment, storage slots are located every one and one-half degrees, which provides storage slots for 240 discs. Of course, not all 240 storage slots need contain discs.

The disc storage rack 16 is supported for rotation about the vertical axis 45 by three support bearings 56, preferably mounted to the base plate 23 at 120 degree intervals. Each support bearing 56 includes a first roller 58 that rotates about a horizontal axis and contacts the underside of the base member 44, and a second roller 60 that rotates about a vertical axis and contacts the outer periphery of the base member. The first rollers 58 support the weight of the disc storage rack 16, while the second rollers 60 constrain the disc storage rack to rotate about the vertical axis 45. The disc storage rack 16 is driven in rotation by a storage rack drive motor 62 that engages the outer periphery of the base member 44 with a friction drive wheel 64. The storage rack drive motor 62 is suspended below a plate 66 that is mounted to the base plate 23 with standoffs 68. The storage rack drive motor 62 rotates the disc storage rack 16 to bring a selected disc 12 to the load position 26 adjacent to the disc staging mechanism 20.

FIGS. 3a through 3d and FIG. 4 illustrate the elements of the disc staging mechanism 20. A support pillar 70 is mounted to the top of the base plate 23 and supports a guide rod 72, which extends horizontally from the support pillar and across the top of the disc storage rack 16. Mounted for movement along the guide rod 72 is a first slide 74 that includes a forked member 76 and a slotted member 78. The forked member 76 hangs above the disc 12, with two prongs 80 and 82 (FIG. 3d) protruding downward on both sides of the disc. The prong 80 is thin enough to fit between the other discs flanking the disc at the load position 26. The slotted member 78, which protrudes downward from the guide rod 72, includes a slotted portion 84 and a flat portion 86.

Figure 4:
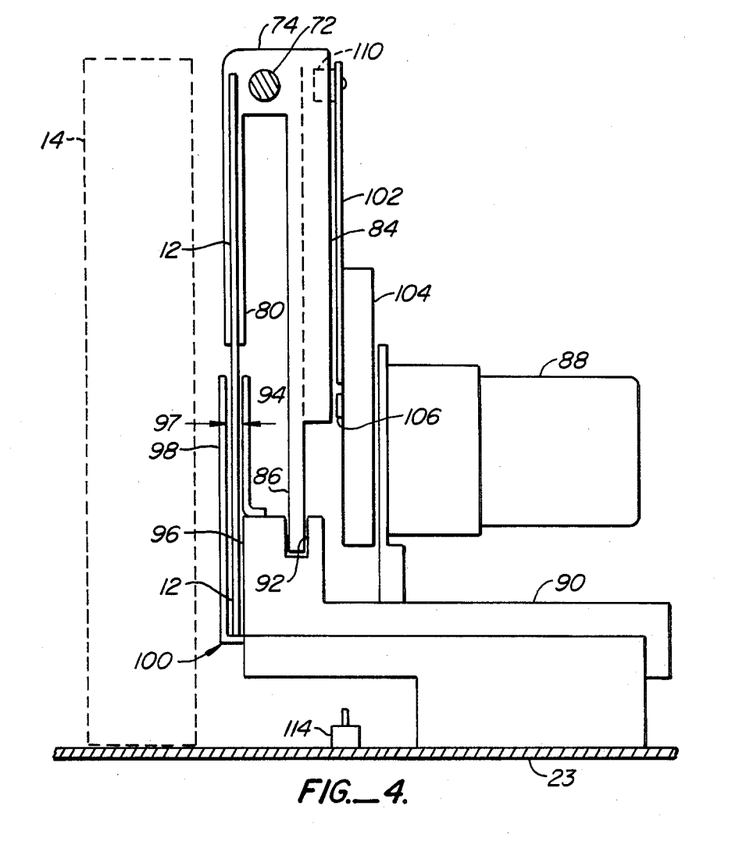
FIG. 4 is a side elevation detail view, partially in section, of the disc staging mechanism of FIG. 3.

As shown in FIG. 4, a motor 88 is mounted to the base plate 23 by a support structure 90. The lower edge of the flat portion 86 of the slotted member 78 rides in and is guided by a groove 92 in the support structure 90 during movement of the first slide 74. Attached to the support structure 90 is a fence 94 that extends upward from the upper surface of the support structure. The vertical face 96 of the support structure 90 and the fence 94 form one side of a guide channel 97 that guides the disc 12 during its movement between the disc storage rack 16 and the staging position adjacent to the disc player 14. The other side of the guide channel 97 is formed by a flange 98 that is part of a second slide 100. A pivot arm 102 and a cam 104 are attached to the output shaft 106 of the motor 88 for rotation therewith. Preferably, the pivot arm 102 and the cam 104 rotate about three quarters of a revolution during each load or unload cycle, and are driven at a substantially constant angular velocity.

As shown in FIGS. 3a through 3d, the pivot arm 102 is, in general, shaped like a T, but with curved upper arms 108 that extend through an arc of approximately ninety degrees. At the end of one of the upper arms 108 is a slot follower 110 that engages the slotted portion 84 of the slotted member 78. At the position shown in FIG. 3a, the other end 112 of the upper arms 108 actuates a limit switch 114 that is mounted under the support structure 90. FIGS. 3a, 3b, 3c, and 3d respectively shown zero, one-fourth, one-half, and three-fourths of a revolution of the pivot arm 102.

Figure 3A:
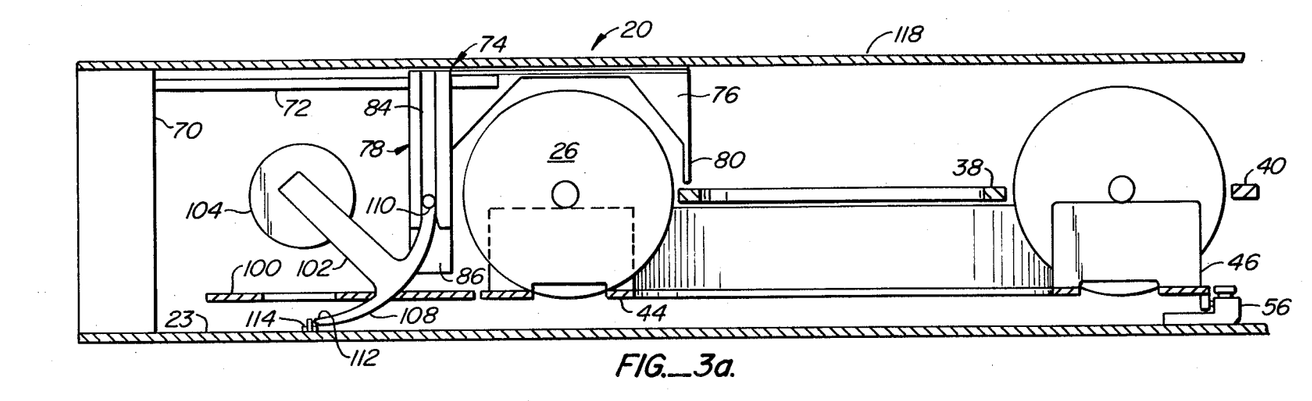
FIGS. 3a through 3d are front elevation views, partially in section, of a disc staging mechanism, and illustrate four sequential steps in the process of loading a selected disc from the disc storage rack to the spindle of a data input/output device.
Figure 3B:
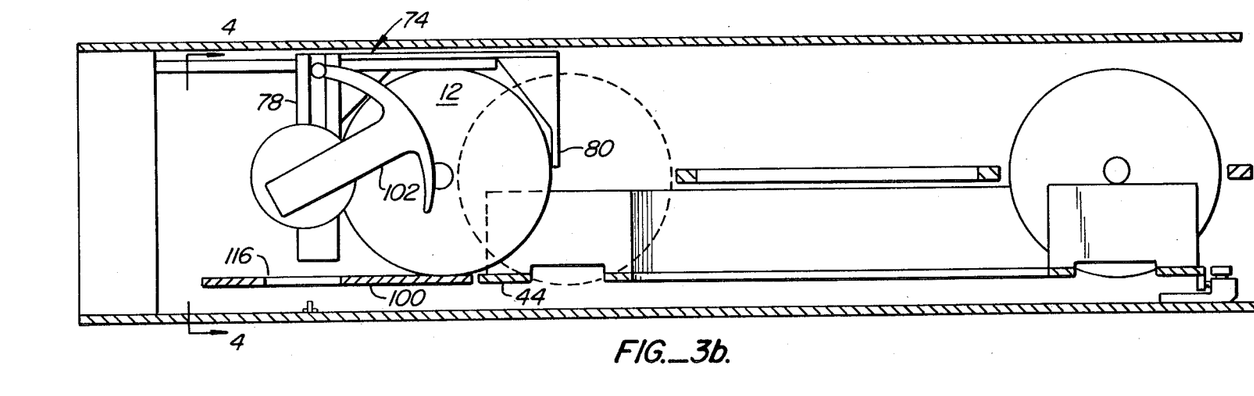
Figure 3C:
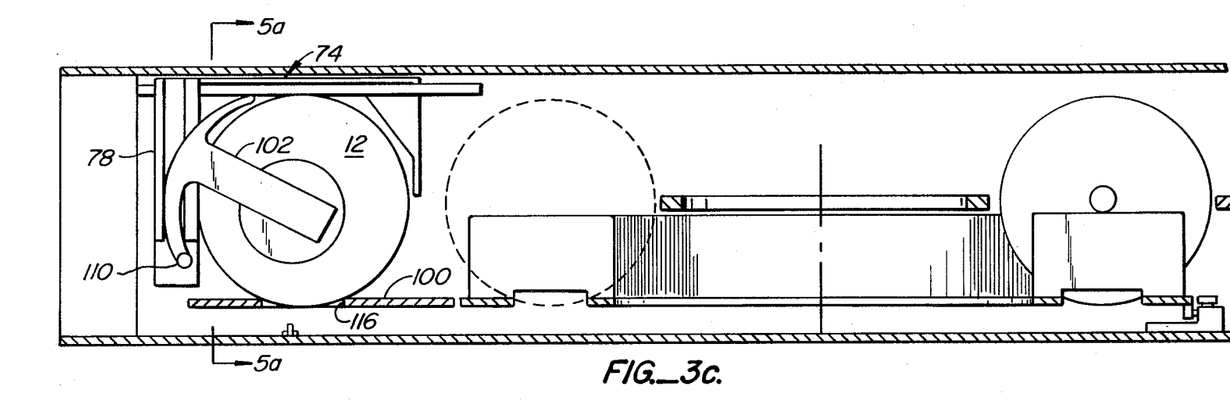
Figure 3D:
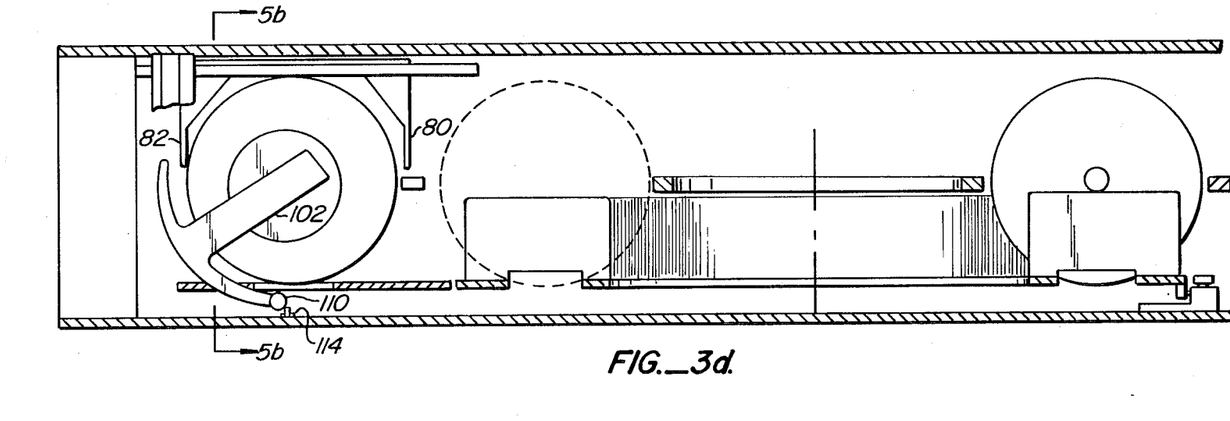

In operation, the disc staging mechanism 20 rolls a disc 12 between the load position 26 on the disc storage rack 16, shown in FIG. 3a, and the staged position 30 adjacent to the associated disc player 14, shown in FIG. 3c. The pivot arm 102 engages the slotted member 78 to move the first slide 74 and the disc 12 between the position shown in FIG. 3a and the position shown in FIG. 3c. When the motor 88 starts to rotate the pivot arm 102, the motion of the slot follower 110 is nearly parallel to the direction of the slot in the slotted member 78, so that the first slide 74 and the disc accelerate slowly from rest. As the first slide 74 starts to move inward, the outer prong 80 pushes on the periphery of the disc, causing the disc to lift slightly upward and roll onto the upper surface of the base member 44. From there, prong 80 pushes on the periphery of the disc to roll the disc onto the second slide 100 and into the guide channel 97, as the pivot arm 102 continues to move the first slide 74 inward. At the position shown in FIG. 3b, the disc 12 is half way to the staged position and the first slide 74 is traveling at its fastest speed because the direction of motion of the slot follower 110 is at that point perpendicular to the direction of the slot. From the midpoint, the first slide 74 and the disc decelerate until they stop at the position shown in FIG. 3c. The disc 12 comes to rest in a pocket 116 in the second slide 100, and the slot follower 110 disengages from the slot in the slotted member 78. The pivot arm 102 continues to rotate to the position shown in FIG. 3d to actuate the spindle loading mechanism 22, as described below. At the position shown in FIG. 3d, the slot follower 110 actuates the limit switch 114 from the other direction.

Note in FIG. 3 the placement of the inner and outer rings 38 and 40. Both rings are positioned in a horizontal plane that passes through a point near the centers of the discs 12. In combination with a lid 118, the rings ensure that the discs 12 remain seated in the disc storage rack 16 even during rough handling. The inner ring 38 is preferably continuous, while the outer ring 40 is preferably continuous except where the disc is loaded into the disc player by the disc staging mechanism 20.

Also note in FIG. 3 that the disc staging mechanism 20 provides clearance for rotation of the disc storage rack 16, except during the loading or unloading of a disc 12. When the disc staging mechanism is at the position shown in FIG. 3d, wherein a disc is loaded on the associated disc player 14, or at the position shown in FIG. 3a, wherein no disc is loaded on the disc player, there exists clearance between the discs loaded on the storage rack 16 and the legs 80 and 82 of the forked member. Such clearance allows the storage rack to be rotated to load another disc onto another disc player. This capability allows for the discs to be staged so that while one disc is being played, another disc is loaded onto another disc player. When play of the first disc is completed, the second disc can be played immediately. Then, while the second disc is being played, the first disc is unloaded to the disc storage rack, the rack is rotated to bring the next disc to be played adjacent to the unused disc player, and that disc is loaded onto that player, ready to be played when the play of the second disc ends. Alternatively, both discs can be accessed simultaneously, which would be useful if parallel access to the discs by multiple users is desired.

In common use today are single-sided discs having information stored on one side only, which requires disc players that access only that one side. The present invention allows two single-sided disc players to access double-sided discs. To do so, one player and its associated disc loading mechanism is oriented to read one side of a disc loaded onto the player, while the other player and associated disc loading mechanism is the "mirror-image" of the first player and mechanism, so that the opposite side of a disc will be accessed when loaded on the second player.

Figure 5A:
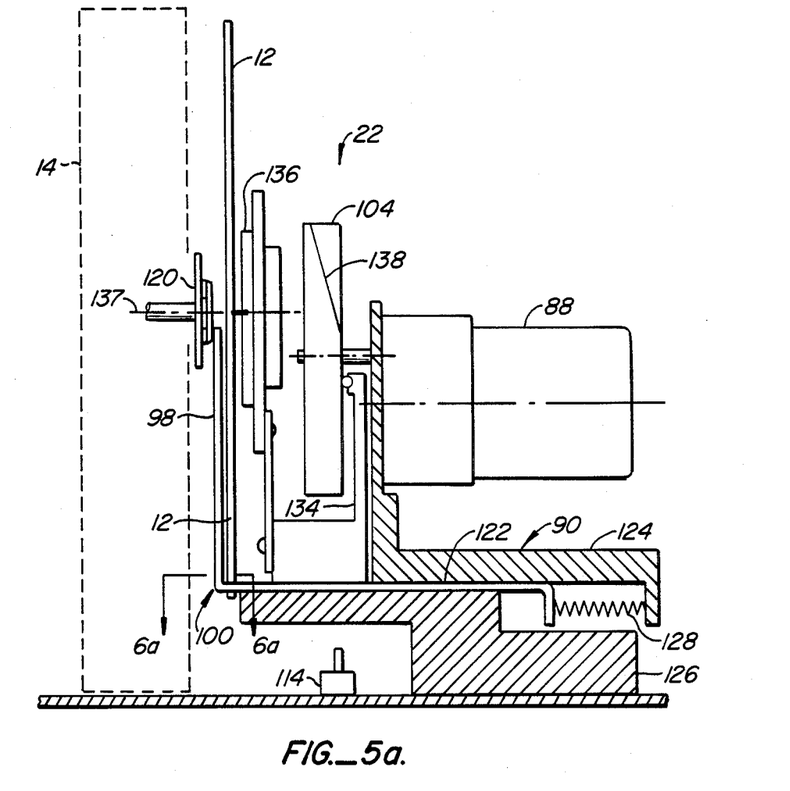
FIGS. 5a and 5b are side sectional views of a spindle loading mechanism, and illustrate two sequential steps in the process of loading a disc from a staging position to the spindle of the data input/output device.
Figure 5B:
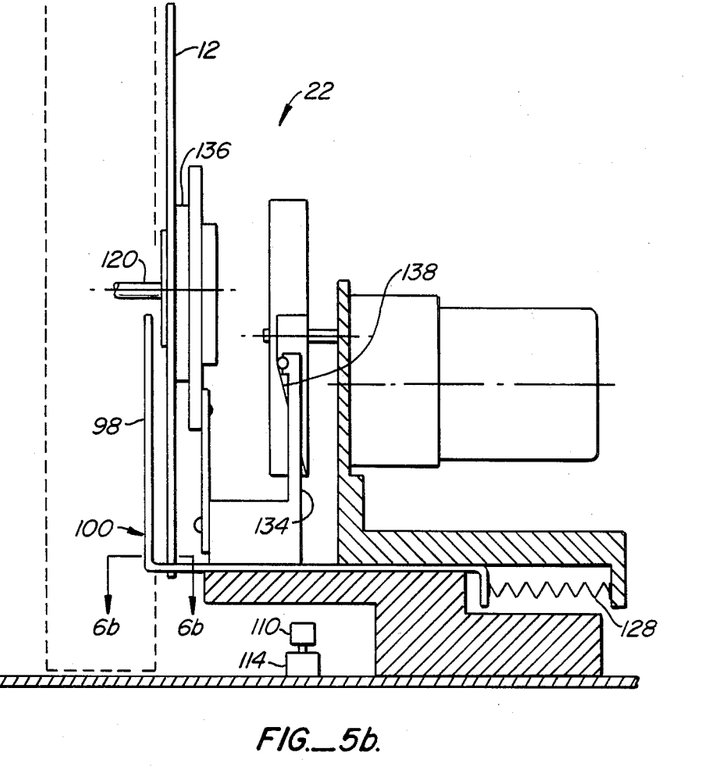

The spindle loading mechanism 22, shown in FIGS. 5a and 5b, operates during the last quarter revolution of the pivot arm 102 and cam 104 to load the disc 12 onto the spindle 120 of the disc player 14. This action is accomplished by a spring 128 pushing the second slide 100 and the disc 12 toward the disc player 14. The second slide 100 is movable between a retracted position, shown in FIG. 5a, and an extended position, shown in FIG. 5b. A guide member 122 portion of the second slide 100 is sandwiched between two plates 124 and 126 of the support structure 90. Attached to the guide member 122 for movement therewith is a cam follower 134 that engages the surface of the cam 104, and a backing plate 136 that rotates about the spindle axis 137. A compression spring 128 biases the second slide 100 toward the left, thus pushing the cam follower 134 against the surface of the cam 104.

During the last quarter revolution of the cam 104, (corresponding to the movement between FIG. 3c and 3d), an inclined surface 138 of the cam allows spring 128 to push the cam follower 134 and the attached second slide 100 toward the spindle of the disc player 14. As the second slide 100 moves toward the disc player 14, the spindle 120 engages the central hole of the disc 12. At the position shown in FIG. 5b, the disc 12 is loaded onto the spindle 120, and the backing plate 136 provides a backing force to ensure that the disc rotates with the spindle.

Figure 6A:
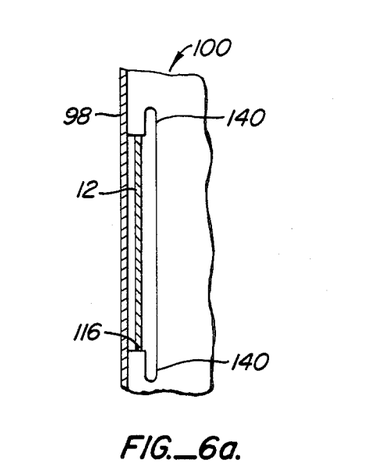
FIGS. 6a and 6b are sectional detail views of a portion of the disc staging mechanism.
Figure 6B:
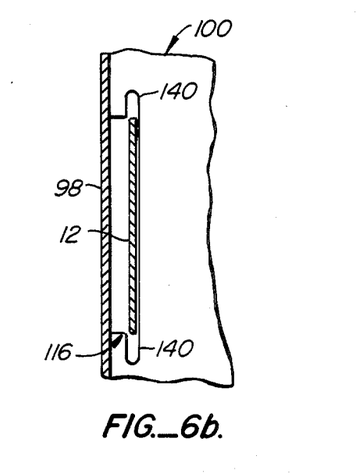

In FIG. 6a, wherein the positions of the disc staging mechanism 20 and the spindle loading mechanism 22 correspond to that shown in FIGS. 3c and 5a, the lower portion of the disc 12 rests on the inner edges of the pocket 116 in the second slide 100. In FIG. 6b, wherein the positions of the disc staging mechanism 20 and the spindle loading mechanism 22 correspond to that shown in FIGS. 3d and 5b, the relative spacing between the flange 98 and the disc 12 has widened because the travel of the disc is halted by the spindle 120, but the travel of the second slide 100 is not. This movement of the disc 12 relative to the second slide 100 moves the disc into an area 140 where the pocket 116 is extended. The pocket 116 thus provides clearance for the disc 12 when loaded onto the spindle 120, so that the disc will not drag against anything as it is rotated during playing.

To move the disc 12 the other way, from the staged position and back to the disc storage rack 16, the motion of the motor 88 is reversed. As the pivot arm 102 rotates from the position shown in FIG. 3d to the position shown in FIG. 3c, the second slide 100 moves from the extended position shown in FIG. 5b to the retracted position shown in FIG. 5a. During that movement of the second slide 100, the upright flange 98 of the second slide removes the disc 12 from the spindle 120 and places the disc into the pocket 116 of the second slide and in line with the guide channel 97. Then, the pivot arm rotates from the position shown in FIG. 3c to the position shown in FIG. 3a to move the first slide 74 back out to the disc storage rack 16. This movement of the first slide 74 causes the inner prong 82 to push on the disc 12, causing the disc to roll it down the guide channel 97 and into the load position 26 on the disc storage rack 16.

Figure 7:
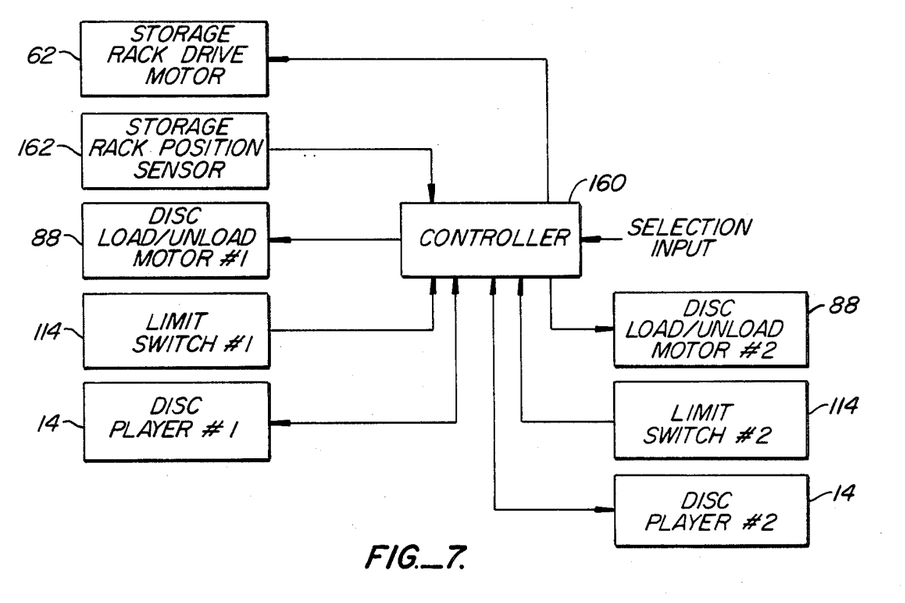
FIGS. 7 is a block diagram of a control circuit utilized in the disc changer apparatus of FIG. 1.

Referring now to FIG. 7, the rotary positioning of the disc storage rack 16 is provided by a controller 160 and a storage rack position sensor 162, in addition to the above described storage rack drive motor 62. The storage rack position sensor 162 senses the rotation of the disc storage rack 16 by counting the number of detents 55 that move past the sensor by optical or other non-contacting means. Alternatively, position sensing could be accomplished by sensing the movement of an encoded wheel attached to the disc storage rack 16.

The controller 160, which is preferably a microprocessor, is connected to the various sensors and motors of the disc changer apparatus 10. The controller 160 receives sensor inputs from the storage rack position sensor 162, which defines the rotary position of the disc storage rack 16. For each disc player 14 and associated disc staging and spindle loading mechanism 20 and 22, the controller 160 is coupled to the disc load/unload motor 88, the limit switch 114, and the disc player itself. Each limit switch 114 indicates whether the associated disc staging mechanism 20 is extended, retracted, or somewhere in between. The controller 160 sends out control signals to the storage rack drive motor 62 to position the disc storage rack 16 and to the motors 88 that actuate the disc staging and spindle loading mechanisms 20 and 22. The controller 160 is also coupled to the disc players 14 for relaying selection information and for responding to disc player signals.

Figure 8:
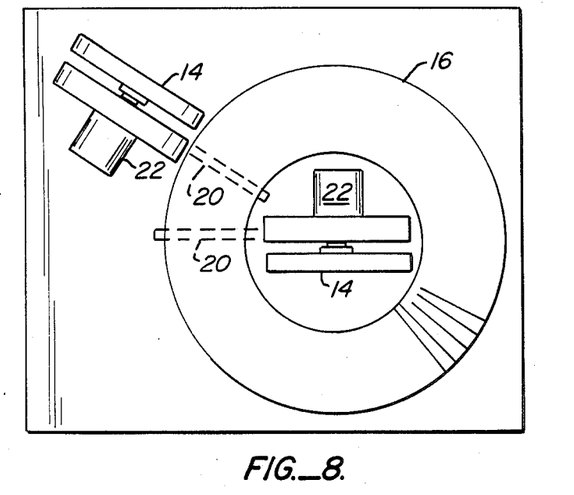
FIG. 8 is a top plan view of an alternative embodiment of the present invention, illustrating the placement of two data input/output devices, one inside and the other outside the toroidal disc storage rack.

An alternative arrangement of the disc players 14 is shown in FIG. 8. One disc player 14 and its associated disc staging and spindle loading mechanisms 20 and 22 are located as described above, while a second disc player and its associated disc staging and spindle loading mechanisms are located within the open area inside the toroidal disc storage rack 16. The outside disc player can access one side of the discs and the inside disc player can access the other side of the discs.

Figure 9:
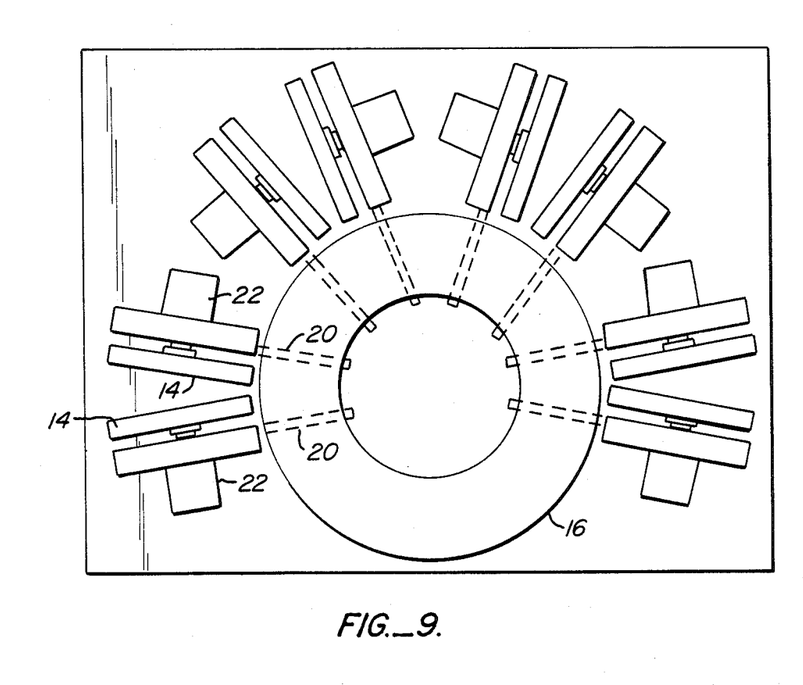
FIG. 9 is a top plan view of another alternative embodiment of the present invention, illustrating the placement of a multitude of data input/output devices surrounding the periphery of the disc storage rack.

Another alternative embodiment, shown in FIG. 9, provides eight disc players, each with its associated disc staging and spindle loading mechanisms. In this case, four of the disc players and associated mechanisms are as described above, and four are reversed from that described above. The first four players can access one side of the discs, while the other four players can access the other side of the discs. This embodiment may be useful for a disc changer apparatus for use with two-sided CD ROM's, thus providing simultaneous access to the discs by several users. Of course, disc players that can access both sides of the discs loaded thereon can be used.

Reversing the disc handling mechanisms or placing one player inside the storage rack are appropriate where the disc player can access only one side of the discs. If disc players are used that can access both sides of the discs, then such arrangements would not be necessary.

From the above description, it will be apparent that the invention disclosed herein provides a novel and advantageous apparatus for an automatic disc changer apparatus for selecting and loading any one of a plurality of data discs onto the spindle of a data input/output device. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. An automatic disc changer apparatus comprising:
   a disc storage rack mounted for rotation about a vertical axis, wherein said storage rack includes means for storing data discs in a toroidal arrangement and includes a base member having a horizontal upper surface that extends radially outward from the discs stored in said storage rack;
   a plurality of data input/output devices positioned radially outside said storage rack, wherein a data disc loaded onto a data input/output device is positioned at substantially the same elevation as the data discs stored in said storage rack;
   disc selecting means coupled to said storage rack for selecting a data disc for loading onto a selected one of the data input/output devices by rotating said storage rack to position the selected data disc adjacent to the selected data input/output device;
   a plurality of disc staging means each associated with a data input/output device for transferring a selected data disc between said storage rack and a staged position adjacent to the selected data input/output device, wherein said disc staging means includes a horizontal surface disposed between said storage rack and said staged position and substantially coplanar with the horizontal upper surface of said storage rack, and includes means for rolling the selected data disc along the horizontal surface in a horizontal and radial direction between said storage rack and said staged position; and
   a plurality of spindle loading means each associated with a data input/output device for transferring the selected data disc between said staged position and a position at which the disc is coupled to a spindle of the data input/output device.

2. An apparatus as recited in claim 1 wherein said storage rack includes a toroidally-shaped base member having a horizontal upper surface and a plurality of radially-disposed spacer members extending vertically upward from said upper surface, wherein adjacent spacer members define radially-extending storage slots for laterally retaining data discs stored in said storage rack, wherein said upper surface includes a depression within each storage slot for receiving the lower edge of a data disc placed therein and for radially retaining the disc during rotation of said storage rack, and wherein said storage rack provides clearance radially outward of each of said storage slots for rolling a data disc along the horizontal upper surface.

3. An apparatus as recited in claim 2 wherein said base member of said storage rack includes inner and outer concentric rings having upper surfaces thereof forming the horizontal upper surface, and wherein said concentric rings are spaced apart to form a concentric slot therebetween that provides said depression within said storage slots.

4. An apparatus as recited in claim 1 further including a stationary outer ring positioned outside the outer periphery of the data discs stored in said storage rack, including a stationary inner ring positioned inside the inner periphery of the data discs stored in said storage rack, and including a lid mounted above said storage rack and the data input/output device, wherein said outer and inner rings and said lid restrain movement of the data discs stored in said storage rack except for movement in a horizontal and radially outward direction for movement between said storage rack and a selected data input/output device.

5. An apparatus as recited in claim 1 wherein the means for rolling of said disc staging means includes a forked member that is supported for movement in a horizontal and radial direction and includes forked member drive means for driving said forked member horizontally in a radially inward or radially outward direction, wherein said prongs of said forked member bracket the selected digital disc, wherein one prong of said forked member contacts the circumference of the selected data disc to roll it radially outward from said storage rack to said staged position, and wherein another prong of said forked member contacts the circumference of the selected data disc to roll it radially inward from said staged position to said storage rack.

6. An apparatus as recited in claim 5 wherein said forked member includes a slotted member attached thereto and extending orthogonally to the direction of travel of said forked member, and wherein said forked member drive means includes a pivotable arm having a follower that engages said slotted member to drive said forked member and selected data disc radially inward and outward.

7. An apparatus as recited in claim 6 wherein said follower of said pivotable arm engages said slotted member at the limits of travel of said forked member in a direction substantially parallel to the slot of said slotted member.

8. An apparatus as recited in claim 1 wherein each of the spindle loading means includes clamping means disposed for movement parallel to the axis of the spindle of the associated data input/output device for clamping the selected data disc onto the spindle, wherein both said disc staging means and said clamping means are driven by a rotary mechanism having an axis parallel to said spindle axis, wherein said rotary mechanism includes means for moving said disc staging means and the selected data disc between said the storage rack and the staged position during one portion of the rotation of said rotary mechanism and for moving said clamping member and the selected data disc between said staged position and the spindle during another portion of the rotation of said rotary mechanism, and wherein the direction of rotation of said rotary mechanism determines the direction of movement of the selected data disc.

9. An apparatus as recited in claim 1 wherein each disc staging means is movable between a first position at which said selected data disc is located on said storage rack and a second position at which said selected data disc is located adjacent to a data input/output device, and wherein said disc staging means provides clearance with respect to said storage rack and the data discs stored therein so that said storage rack can be rotated when said disc staging means is at either said first position or said second position.

10. An apparatus as recited in claim 1 wherein said horizontal surface of each disc staging means includes a pocket recessed below the horizontal surface thereof and disposed adjacent the staged position, wherein said pocket is operable for receiving the lower edge of said selected data disc and aligning the disc with respect to the spindle of the data input/output device.

11. An automatic disc changer apparatus comprising:
a disc storage rack mounted for rotation about a vertical axis, wherein said storage rack includes means for storing data discs in a toroidal arrangement and includes a base member having a horizontal upper surface that extends radially inward and outward from the discs stored in said storage rack;
two data input/output devices one positioned within the center of said storage rack and the other positioned radially outside said storage rack, wherein a data disc loaded onto a data input/output device is positioned at substantially the same elevation as the data discs stored in said storage rack;
disc selecting means coupled to said storage rack for selecting a data disc for loading onto a selected one of the data input/output devices by rotating said storage rack to position the selected data disc adjacent to the selected data input/output device;
two disc staging means each associated with a data input/output device for transferring a selected data disc between said storage rack and a staged position adjacent to the selected data input/output device, wherein said disc staging means includes a horizontal ramp disposed between said storage rack and said staged position and substantially coplanar with the horizontal upper surface of said storage rack, and includes means for rolling the selected data disc along the horizontal ramp in a horizontal and radial direction between said storage rack and said staged position; and
two spindle loading means each associated with a data input/output device for transferring the selected data disc between said staged position and a position at which the disc is coupled to a spindle of the data input/output device.

12. An automatic disc changer apparatus comprising:
a disc storage rack mounted for rotation about a vertical axis, wherein said storage rack includes means for storing data discs in a toroidal arrangement, includes a base member having a horizontal upper surface that extends radially outward from the discs stored in said storage rack, and includes a plurality of radially-disposed spacer members extending upward from said upper surface, wherein adjacent spacer members define radially-extending storage slots for laterally retaining data discs stored in said storage rack, wherein said upper surface includes a depression within each storage slot for receiving the lower edge of a data disc placed therein and for radially retaining the disc during rotation of said storage rack, and wherein said storage rack provides clearance radially outward of each of said storage slots for rolling a data disc along the horizontal upper surface;

a plurality of data input/output devices positioned radially outside said storage rack, wherein a data disc loaded onto a data input/output device is positioned at substantially the same elevation as the data discs stored in said storage rack;

a stationary outer ring positioned outside the outer periphery of the data discs stored in said storage rack and a stationary inner ring positioned inside the inner periphery of the data discs stored in said storage rack;

a lid mounted above said storage rack and the data input/output devices;

disc selecting means coupled to said storage rack for selecting a data disc for loading onto a selected one the data input/output devices by rotating said storage rack to position the selected data disc adjacent to the selected data input/output device;

a plurality of ramps each associated with a data input/output device and disposed between the storage rack and its associated data input/output device, wherein each ramp has a top surface positioned at substantially the same elevation as the horizontal upper surface of said storage rack;

a plurality of disc transport means each associated with a data input/output device for transferring a selected data disc between said storage rack and a spindle of the selected data input/output device, wherein each disc transport means includes a linear slide mechanism, a clamping mechanism, and a rotary drive mechanism that is operable for rotary movement, wherein one portion of the rotation of said rotary drive mechanism drives said linear slide mechanism and the selected data disc between the storage rack and a staged position adjacent to the spindle of the associated data input/output device, wherein another portion of the rotation of said rotary mechanism drives said clamping mechanism and the selected data disc between said staged position and the spindle of the data input/output device, and wherein the direction of rotation of said rotary mechanism determines the direction of movement of the selected data disc;

wherein said linear slide mechanism includes a forked member that is supported for movement in a horizontal and radial direction and has two prongs that bracket the selected data disc, wherein said forked member has one prong that contacts the circumference of the selected data disc to roll it radially outward from said storage rack to said staged position and has another prong that contacts the circumference of the selected data disc to roll it radially inward from said staged position to said storage rack, and includes a slotted member attached thereto and extending orthogonally to the direction of travel of said forked member, and wherein said forked member of said linear slide mechanism provides clearance for said storage rack to rotate when said forked member is positioned at either said storage rack or said staged position;

wherein said clamping mechanism includes a clamp slide that is operable for movement parallel to the spindle axis and is operable for clamping the selected data disc against the spindle of the associated data input/output device; and wherein said rotary drive mechanism includes a pivotable arm having a follower that is operable for engaging said slotted member during said one portion of the rotation of said rotary drive mechanism to drive said linear slide mechanism and the selected data disc radially inward and outward, and includes a cam mechanism that engages said clamp slide during said another portion of the rotation of said rotary drive mechanism to drive said clamp slide and the selected data disc between said staged position and the spindle of the data input/output device.

* * * * *